Figure 3:
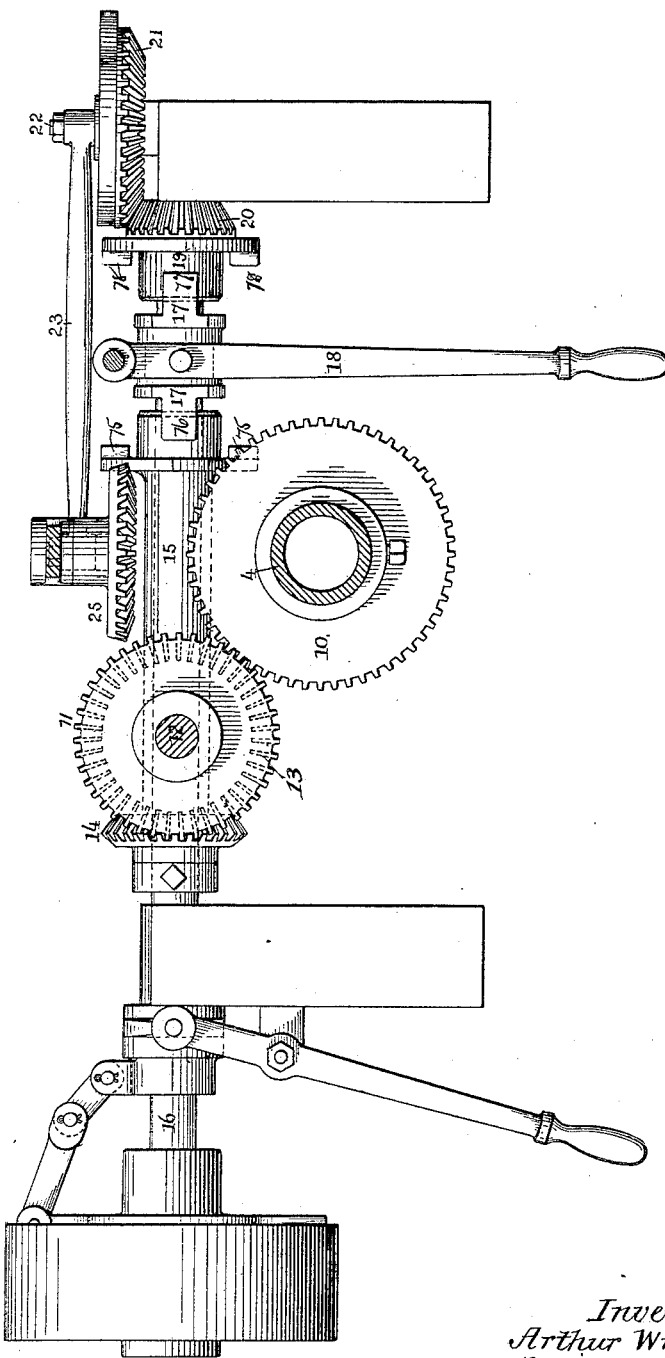

(No Model.) 5 Sheets—Sheet 1.
B. HOLT & A. WRIGHTSON.
CIRCULAR KNITTING MACHINE.
No. 424,787. Patented Apr. 1, 1890.
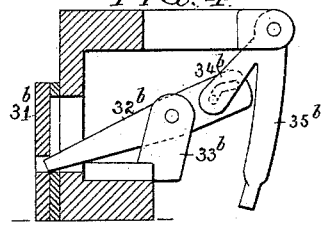
FIG. 4.
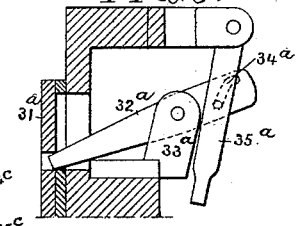
FIG. 5.
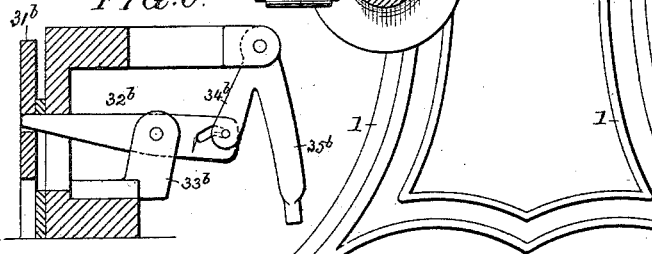
FIG. 1.
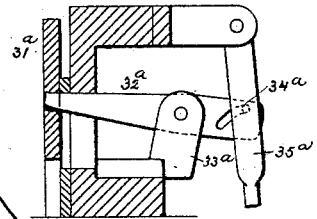
FIG. 7.
FIG. 6.
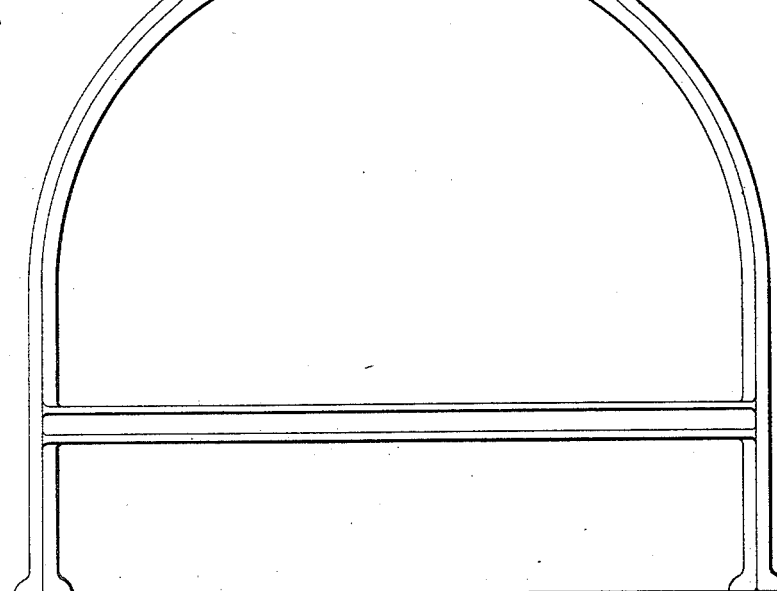
Witnesses
John J. Geary
Alex Barkoff
Inventors
Arthur Wrightson &
Benjamin Holt
By their Attys
Howson & Howson
N. PETERS, Photo-Lithographer, Washington, D. C.

(No Model.) 5 Sheets—Sheet 2.
B. HOLT & A. WRIGHTSON.
CIRCULAR KNITTING MACHINE.
No. 424,787. Patented Apr. 1, 1890.
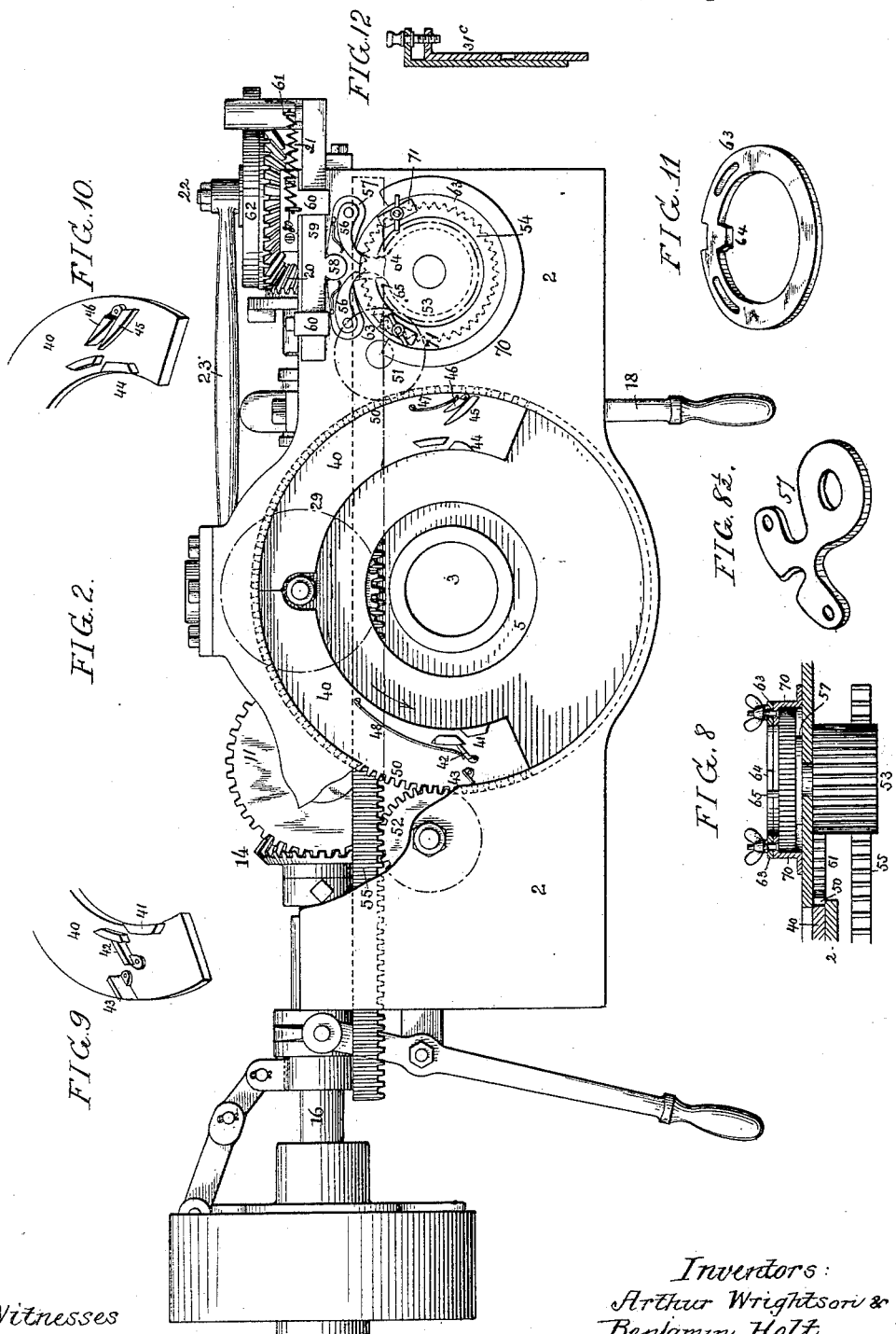
Witnesses
John J. Leary
Alex. Barkoff
Inventors:
Arthur Wrightson &
Benjamin Holt
by their Attorneys
Howson & Howson (No Model.) 5 Sheets—Sheet 3.

B. HOLT & A. WRIGHTSON.
CIRCULAR KNITTING MACHINE.

No. 424,787. Patented Apr. 1, 1890.

Witnesses
John J. Seary
Alex Barkoff

Inventors
Arthur Wrightson &
Benjamin Holt
by their Attorneys
Howson & Howson (No Model.) 5 Sheets—Sheet 4.
B. HOLT & A. WRIGHTSON.
CIRCULAR KNITTING MACHINE.
No. 424,787. Patented Apr. 1, 1890.
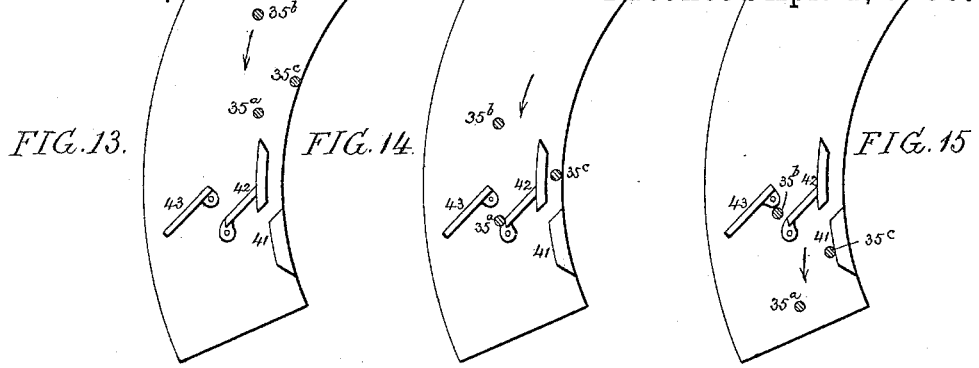
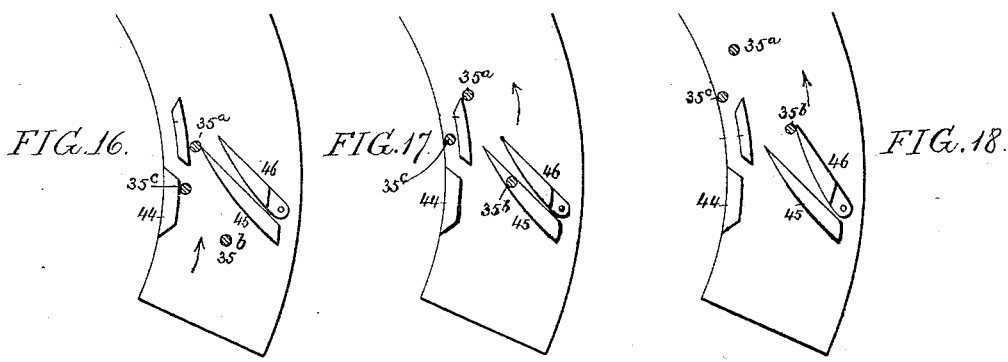
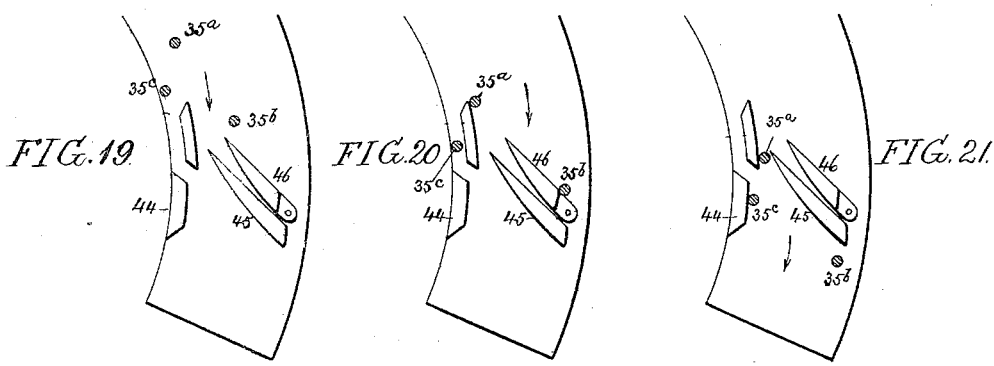
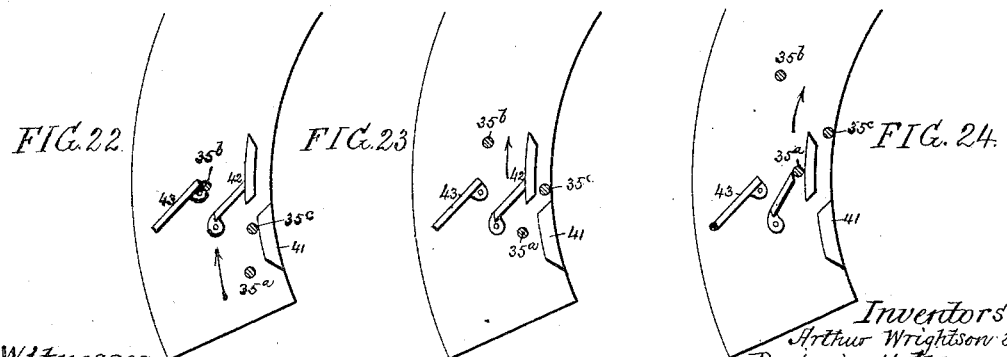
Witnesses:
John J. Seary
Alex. Barkoff
Inventors
Arthur Wrightson &
Benjamin Holt
by their Attorneys
Howson & Howson (No Model.) 5 Sheets—Sheet 5.
B. HOLT & A. WRIGHTSON.
CIRCULAR KNITTING MACHINE.
No. 424,787. Patented Apr. 1, 1890.
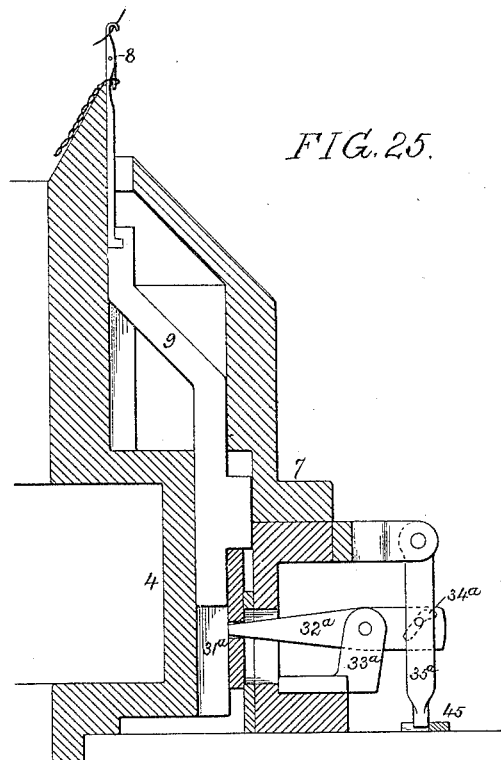
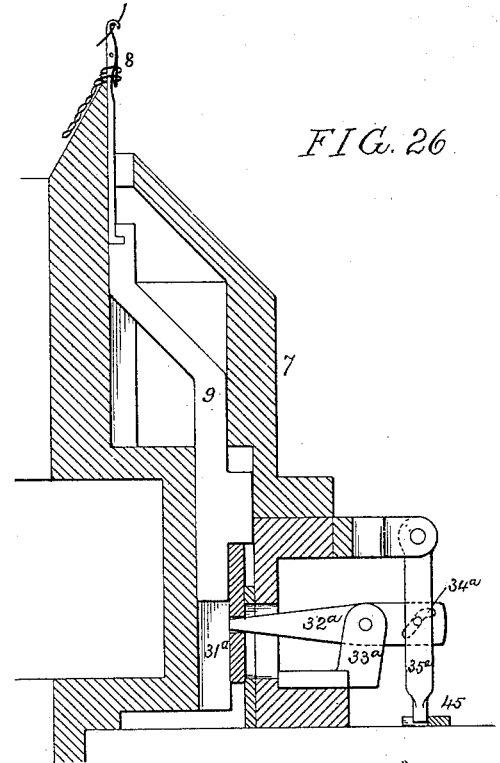
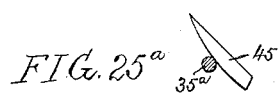
FIG. 27.
Witnesses:
Hamilton D. Turner
Alex Darkoff
Inventors:
Arthur Wrightson &
Benjamin Holt
by their Attorneys
Howson & Howson

UNITED STATES PATENT OFFICE.

BENJAMIN HOLT, OF CAMDEN, NEW JERSEY, AND ARTHUR WRIGHTSON, OF PHILADELPHIA, PENNSYLVANIA.

CIRCULAR-KNITTING MACHINE.

SPECIFICATION forming part of Letters Patent No. 424,787, dated April 1, 1890.

Application filed May 13, 1889. Serial No. 310,505. (No model.)

*To all whom it may concern:*

Be it known that we, BENJAMIN HOLT, of Camden, New Jersey, and ARTHUR WRIGHTSON, of Philadelphia, Pennsylvania, both citizens of the United States, have invented certain Improvements in Circular-Knitting Machines, of which the following is a specification.

The object of our invention is to construct a simple and compact form of automatic knitting-machine—that is to say, one in which the needles are thrown into and out of action successively for the formation of a heel or toe pocket upon a knitted tube, our invention comprising certain features in the construction of the machine, all as fully described and claimed hereinafter.

In the accompanying drawings, Figure 1 is a longitudinal section of a knitting-machine constructed in accordance with our invention. Fig. 2 is a plan view of the same, with the needle-cylinder and cam-box removed. Fig. 3 is a sectional plan view, partly in elevation, on the line 1 2, Fig. 1. Figs. 4 to 12 are detached views of parts of the machine illustrating features of construction, and Figs. 13 to 27 are diagrams illustrating the operation of parts of the machine.

The main frame 1 of the machine supports a table or bed 2, in which is a central bearing 3 for the needle-cylinder 4, and an annular bearing 5 for a downwardly-projecting flange 6 on the bottom of a cam-box 7, the upper portion of the needle-cylinder being of contracted diameter in comparison with the portion below the same, and the needles 8 being provided with jacks 9, which comprise upper and lower portions in different vertical planes, and a transverse portion connecting said upper and lower portions, the object of which construction is to secure a greater diameter for that portion of the needle-cylinder in which the lower or bitted portions of the jacks work, whereby with a fine gage at the head of the cylinder, due to the small diameter of the same, the needle-jacks around the expanded portion of the cylinder are, owing to the larger diameter, at a sufficient distance apart to permit of their effective operation by the cams of the cam-box, and the ready dropping of a needle out of action or the bringing of a needle into action, as required in the operation of the machine.

The needle-cylinder has at its lower end a spur-wheel 10, with which engages a spur-wheel 11, hung to a stud 12, depending from the table 2 of the machine, this spur-wheel being secured to or forming part of a bevel-wheel 13, (see dotted lines, Fig. 3,) which engages with a bevel-pinion 14 on a sleeve 15, turning on the driving-shaft 16, and having lugs 75 for engagement with lugs 76 on one half of a duplex clutch-member 17, which is operated by a lever 18, the other half of the clutch-member having lugs 77 for engagement with lugs 78 on a sleeve 19, secured to or forming part of a bevel-pinion 20, which meshes into a bevel-wheel 21 hung to a stud at one side of the frame, this bevel-pinion having a crank-pin 22, connected by a rod 23 to an arm 24 of a toothed segment 25, hung to a bracket 26 on the table 2 and engaging with a bevel-pinion 27, free to turn on a stud 28, secured to and depending from said table 2, this bevel-pinion 27 being secured to or forming part of a spur-wheel 29, which meshes with a spur-pinion 30, formed on the depending flange 6 of the cam-box 7. When the clutch member 17, therefore, is in engagement with the sleeve 15, a rotating movement will be imparted to the needle-cylinder of the machine; but when the clutch member is moved so as to be free from engagement with the sleeve 15 and caused to engage with the sleeve 19 a reciprocating or back-and-forth movement will be imparted to the cam-box, it being understood that the throw of the crank-pin 22 is only sufficient to cause such a vibration of the toothed segment 25 as will effect the reciprocation of the cam-box to the desired extent.

The needles of the cylinder are rendered active or inactive, as desired, by manipulation of the cams of the cam-box, the drawing-down cam $31^c$—that is to say, the cam whereby the needles are depressed, so as to draw their stitches—being under control of a lever $32^c$, hung to a bracket $33^c$ on the cam-box, and this lever having at its outer end a cam-slot $34^c$, with which engages a pin on a lever $35^c$, hung to a bracket $36^c$ on the cam-box, while the lifting-cams $31^a$ and $31^b$—that is to say, the cams whereby the needles are elevated, so as to clear the old stitches and receive the thread to form new stitches—are controlled by a substantially-similar combination of levers, as shown in Figs. 4 and 5, the cam-slots of the levers being preferably so formed that when the pin is at either extreme of the slot it will lock the lever and thus prevent accidental movement of the cam controlled thereby from either the elevated or depressed position, any such movement being effected only by the movement of the lever $35^a$, $35^b$, or $35^c$, as the case may be.

The cams are located in respect to each other as usual in machines of this class—that is to say, the raising-cams are one on each side of the drawing-down cam—so that when the cam-cylinder is being reciprocated in one direction one raising-cam—say the cam $31^a$—will lift the needles in advance of the drawing-down cam, while when the cam-cylinder is reciprocated in the opposite direction the other raising-cam $31^b$ will lift the needles for the action of the drawing-down cam. These levers are actuated by a series of cams on a pair of segmental cam-slides 40, suitably guided in a recessed portion of the table or bed 2 of the machine, as shown in Figs. 1 and 2, one of said cam-slides having cams 41, for actuating the lever $35^c$ of the drawing-down cam $31^c$, so as to throw it either up or down, a pivoted cam 42 serving to operate the lever $35^a$ of the lifting-cam $31^a$, so as to raise the latter into operative position, and another cam 43 serving to operate the lever $35^b$ of the other lifting-cam $31^b$, so as to depress or throw it into inoperative position, while the other slide 40 has cams 44, similar to the cams 41 and serving to actuate in both directions the lever controlling the drawing-down cam, a cam 45 serving to actuate the lever $35^a$ of the lifting-cam $31^a$, so as to depress the said cam and render it inoperative, and a pivoted cam 46 serving to elevate the lever $35^b$ of the other lifting-cam $31^b$ and render it operative, it being understood that the levers of the three cams terminate in different circumferential planes, so that the cams 41 and 44 will act only upon the lever $35^c$ of the drawing-down cam, the cams 42 and 45 will act only upon the lever $35^a$ of one lifting-cam, and the cams 43 and 46 will act only upon the lever $35^b$ of the other lifting-cam. Supposing, therefore, that all of the cams of the cylinder are in inoperative position—that is to say, both the lifting-cams are down, as shown in Figs. 4 and 5, and the drawing-down cam is elevated, as in Fig. 1—and supposing that the cam-box is so adjusted that its cams are in position somewhere within the half-circle under which the slides are arranged, as shown in Fig. 2, and that said cam-box is about to be moved in the direction of the arrow in said figure, the lower ends of the operating-levers of the various cams may, for instance, occupy the position represented by the three shaded circles in Fig. 13; hence it will be seen that the first effect of moving the cam-box in the direction of the arrow, Fig. 2, will be to bring the lever $35^a$ of the forward lifting-cam $31^a$ under control of the cam 42, as shown in Fig. 14, so that the cam $31^a$ will be lifted into operative position, as shown in Fig. 7, and will commence to act upon the needles of the cylinder. The next movement will be to bring the lever $35^c$ of the drawing-down cam $31^c$ under control of the lifting portion of the cam 41, as shown in Fig. 15, so that said lever will be operated to depress the drawing-down cam into operative position, the lever $35^b$ of the final lifting-cam passing the cam 43 without coming into contact with the same, so that the cam $31^b$ remains down. When the cam-box has made a half-turn, the lever $35^a$ of the lifting-cam $31^a$ in advance will strike the cam 45 and will be operated thereby, as shown in Fig. 16, so as to throw said lifting-cam downward or render it inoperative, as in Fig. 5, the lever $35^c$ of the drawing-down cam next coming under the influence of the depressing portion of the cam 44, as shown in Fig. 17, and the cam $31^c$ being thereby raised so as to be rendered inoperative, the lever $35^b$ of the final lifting-cam $31^b$ striking the cam 46, which is a pivoted cam acted upon by a spring 47, and hence yields, as shown in Fig. 18, without effecting any movement of said lever $35^b$. The parts being now in the position shown in Fig. 19, the movement of the cam box or cylinder is reversed; hence the cam 46 acts upon the lever $35^b$, as shown in Fig. 20, and consequently operates what is now the leading lifter-cam $31^b$, so as to throw it into operative position, as shown in Fig. 6, the lever $35^c$ of the drawing-down cam then coming under the influence of the lifting portion of the cam 44, as shown in Fig. 21, so as to move said cam into operative position, and the lever of the final lifting-cam $35^a$ passing the cam 45 without coming in contact with the same. At the opposite end of the stroke of the cam-box the lever $35^b$ of the leading lifter-cam is struck by the cam 43 and moved, as shown in Fig. 22, so as to throw down said cam or return it to the inoperative position, the lever $35^c$ of the drawing-down cam being then actuated by the depressing portion of the cam 41, as shown in Fig. 23, so as to render said drawing-down cam inoperative, and the lever $35^a$ of the final lifting-cam striking the cam 42 and tripping the same, as shown in Fig. 24, said cam 42 being, like the cam 46, a pivoted cam acted on by a spring 48. It will thus be seen that on each reciprocation of the cam-box the leading lifter-cam is first moved into operative position, and the drawing-down cam is subsequently moved to operative position, and these cams are subsequently rendered inoperative, the number of needles in action on the needle-cylinder on each reciprocation of the cam-box depending upon the points in the movement of said cam-box at which the lifting and drawing-down cams are so rendered operative and inoperative; hence it will be understood that by moving the cam-slides 40 so as to bring the cams carried thereby nearer to each other, the number of needles in action on the cylinder will be diminished, and by then separating the cam-slides so as to move the cams carried thereby apart from each other, the number of needles in action on the cylinder will be increased, and by imparting successive movements of limited extent to the cam-slides, first in one direction and then in the opposite direction, needles at each end of the acting set may first be thrown out of action and subsequently brought into action again, so as to effect the widening and narrowing of the web produced upon the needles as is necessary in the production of a heel or toe pocket. This intermittent movement of the cam carrying slides 40 is effected by the mechanism shown in Figs. 1 and 2, and comprising racks 50, formed on the outer edges of the cam-slides and meshing with spur-pinions 51 and 52, turning freely on studs depending from the table 2, the pinion 51 meshing with the rack of one cam-slide and with a pinion 53, secured to the shaft of a rack-wheel 54, turning in the table 2, while the pinion 52 meshes with the rack of the other cam-slide and with a longitudinal rack-bar 55, extending longitudinally beneath the table and engaging with the pinion 53, as shown by dotted lines in Fig. 2 and in Fig. 8.

Intermittent movements first in one direction and then in the opposite direction are imparted to the rack-wheel 54 by means of pawls 56, carried by a vibrating slide 57, Fig. 8½, which is hung to the shaft of the rack-wheel, as shown in Fig. 8 and by dotted lines in Fig. 2, and has a recess engaging with a tooth 58 on a bar 59, the latter being reciprocated in suitable bearings 60 on the table 2 by means of an arm 61, acted on by a cam-disk 62, secured to or forming part of the bevel-pinion 21, above referred to, a spring 80 serving to retract the bar after it has been moved outward by the cam.

The teeth of the rack-wheel 54 are so formed that they may be engaged by either of the pawls 56, the wheel being moved to the right when its teeth are engaged by one of said pawls and being moved in the contrary direction when its teeth are engaged by the other pawl.

In starting the movement one of the pawls is held out of action by reason of the action thereupon of one end of a tripper-plate 63, Fig. 11, which in the present instance is in the form of a ring mounted upon the casing 70, which partially embraces and overlies the rack-wheel 54, the ring 63 being prevented from moving accidentally by means of friction-springs 71, and said ring having an internal lug 64, adapted to be struck and actuated by a pin 65, projecting upward from the face of the rack-wheel, as shown in Figs. 2 and 8. When the rack-wheel has been moved to the proper extent in one direction, this pin strikes the lug of the tripper-plate and moves the same so as to throw out of action the pawl formerly operative and permit the other pawl to drop into action, whereupon a reverse movement will be imparted to the rack-wheel and to the cam-slides operated therefrom, this reverse movement continuing until the desired backward movement of the cam-slides has continued to the proper extent, whereupon the pin 65 of the rack-wheel will strike the lug 64 of the tripper-plate and move the parts to their original position, so that the pawls will be in condition to repeat the operation when the cam-slides 40 have to be again expanded and contracted.

The tripping-cams of the slides 40, which act upon the lifting-cams of the cam-box, are by preference so located in respect to said cams and to the needles of the cylinder that the end needle of the fashioning set just before it is dropped out of action and the end needle of the set just before it is being brought into action is operated as a tuck-needle—that is to say, it receives the new knitting-thread without being lifted to the clearing-point, or so as to slip back of its latch the stitch or stitches already formed on it. This will be understood on reference to Figs. 25, 25ª, 26, 26ª, and 27. The lever 35ª of the advance or lifting cam 31ª is fully moved by the raising-cam 42, and the lifting-cam is therefore fully elevated by the time it acts upon the first needle of the fashioning set—say the needle y in Fig. 27. While the cam-box is moving forward, however, the cam-slide 40 is contracted, so that the lever 35ª of the advance or lifting cam 31ª comes under the influence of the depressing-cam 45, as shown at Fig. 25ª, before said lifting-cam has passed the needle at the end of the fashioning set—for instance, the needle x of the diagram, Fig. 27—so that before the apex of the cam 31ª has passed the bit of said needle the cam has, owing to the action of the cam 45 on the lever 35ª, been lowered to such an extent that the needle will only be raised to the tuck-point, as shown in Fig. 25, a stitch being thus formed on it in addition to the stitch which it already carries and which it retains. On the reverse movement of the cam-box when the lifting-cam 31ᵇ passes the needle x the lever 35ᵇ will not have been acted upon by the cam 46 sufficiently to cause said cam 31ᵇ to elevate the needle x into position to receive the thread. Consequently the needle is out of action and retains its two stitches, the first needle to receive the thread on the return movement being the needle x'. Precisely the same operation takes place at the opposite end of the set, the lever 35ᵇ being acted upon by the depressing-cam 43 before the advance or lifting cam 31ᵇ, controlled by said lever, reaches the needle $y$, and said cam being therefore lowered to such an extent before its apex passes the bit of said needle $y$ that the latter will be raised only to the tuck-point, and will thus receive two stitches in the same manner as the needle $x$. On the next forward movement of the cam-box the needle $y$ will be out of action and will retain its two stitches, the first needle in action being the needle $y'$. There is then a further contraction of the cam-slides 40, so that the end needles $x'$ $y'$ of the fashioning-set will be tucked and dropped out of action, and after this the needles $x^2$ and $y^2$, and so on until the fabric has been narrowed to the desired extent and the widening operation commences. Supposing that the last narrowing-needles were the needles $x^{20}$ and $y^{20}$, the needles from $y^{20}$ to $y$ and from $x^{20}$ to $x$ are now to be brought into action successively, and before each one is brought into action it is to receive and retain a new stitch in addition to the two stitches it already contains. The needle $y^{20}$ being the last needle to be thrown out of action, the needle $x^{20}$ will be the first needle to be brought into action, and on the movement of the cam-box from the needle $y^{20}$ to the needle $x^{20}$ the latter will only be lifted to the tuck-point by the cam $31^a$, so as to receive its third stitch, as shown in Fig. 26, and on the back movement will not be lifted into action by the cam $31^b$ as the latter passes it. In the same way the needle $y^{20}$ will be only lifted to the tuck-point by the cam $31^b$ on the back movement and on the next forward movement of the cam-box will not be lifted into action by the cam $31^a$ when it passes it. Before the cam $31^a$ again reaches the needle $x^{20}$, however, the cam-slides 40 will have been expanded slightly and the said needle will now be raised to the full knitting-point, the needle $x^{19}$ being tucked, and on the back movement the needle $y^{20}$ will be lifted to the full knitting-point by the cam $31^b$ and the needle $y^{19}$ tucked, and so on, the needles $x^{19}$ $y^{19}$ $x^{18}$ $y^{18}$ $x^{17}$ $y^{17}$ and so on being first tucked and then lifted into action until the full widening of the web has been effected and all the needles from $x$ to $y$ are in action. By thus forming these three stitches along the narrowing line a close joining of the tapered webs is insured, and the formation of the usual objectionable openings along the narrowing-line is effectually prevented.

It will be evident that although we have described our invention as applied to a circular-knitting machine, the invention is applicable as well to these knitting-machines in which the needle-bed is straight and the cam-box is caused to reciprocate longitudinally instead of being reciprocated back and forth in a segmental path. Although it is preferable, also, to trip the drawing-down cam of the machine as well as the lifting-cams, it is not absolutely necessary that the drawing-down cam should be so tripped, as it might draw down the needles to the full end of the traverse of the cam-box in each direction, the only object in tripping the drawing-down cam at the end of the acting set of the needles being to prevent useless movement of the inactive needles and needless stretching of the stitches carried thereby.

Having thus described our invention, we claim and desire to secure by Letters Patent—

1. The combination, in a knitting-machine, of the needle-carrier and its needles, a cam-box having lifting and drawing-down cams for said needles, levers for actuating said lifting-cams, slides provided with cams for operating said levers, and means for moving said slides toward and from each other, so as to cause the lifting-cams to be rendered operative and inoperative at different points in the traverse of the cam-box, substantially as specified.

2. The combination of the needle-carrier and its needles, the cam-box having lifting and drawing-down cams, levers for actuating said lifting and drawing-down cams, slides having cams for acting upon said levers to move them into one or the other of their extreme positions, and means for moving said slides toward and from each other, so as to effect the movement of the lifting and drawing-down cams to operative and inoperative positions at different points in the traverse of the cam-box, substantially as specified.

3. The combination of the cam-slides of the machine, a rack-wheel, and gearing connecting said rack-wheel to said cam-slides, with operating devices for the rack-wheel, comprising a carrier having opposite pawls, a reciprocating bar engaging with said carrier, a tripper-plate for acting on the pawls, and a pin or projection on the rack-wheel for acting on a lug on said tripper-plate to throw first one and then the other of the pawls out of operative position, substantially as specified.

4. The combination of the cam-slides having racks, the rack-wheel, means for operating the latter, and gearing for transmitting the movement of said rack-wheel to the cam-slides, said gearing comprising a pinion secured to the rack-wheel a pinion interposed between the same and the rack of one slide, and a longitudinal rack engaging with the pinion of the rack-wheel and meshing into a pinion which engages with the rack of the other cam-slide, substantially as specified.

5. The combination of the cylinder and cam-box of the machine, each having a spur-wheel or rack, the driving-shaft having two sleeves, a clutch member whereby either sleeve may be connected to the shaft or released therefrom, gearing whereby the movement of one sleeve is transmitted to the needle-cylinder, and gear-wheels, a crank-pin, connecting-rod, and vibrating toothed segment, whereby the movement of the other sleeve is transmitted to the cam-box, substantially as specified.

6. The combination of the needle-cylinder and its needles, the cam-box and its cams, the cam-operating levers, and cams for operating the latter, said lever-operating cams occupying such relation to the needles of the carrier that the end needle of the acting set will be lifted to the tuck-point before being dropped out of action and on coming into action, substantially as specified.

In testimony whereof we have signed our names to this specification in the presence of two subscribing witnesses.

BENJN. HOLT.
ARTHUR WRIGHTSON.

Witnesses:
WILLIAM D. CONNER,
HARRY SMITH.